UNITED STATES PATENT OFFICE.

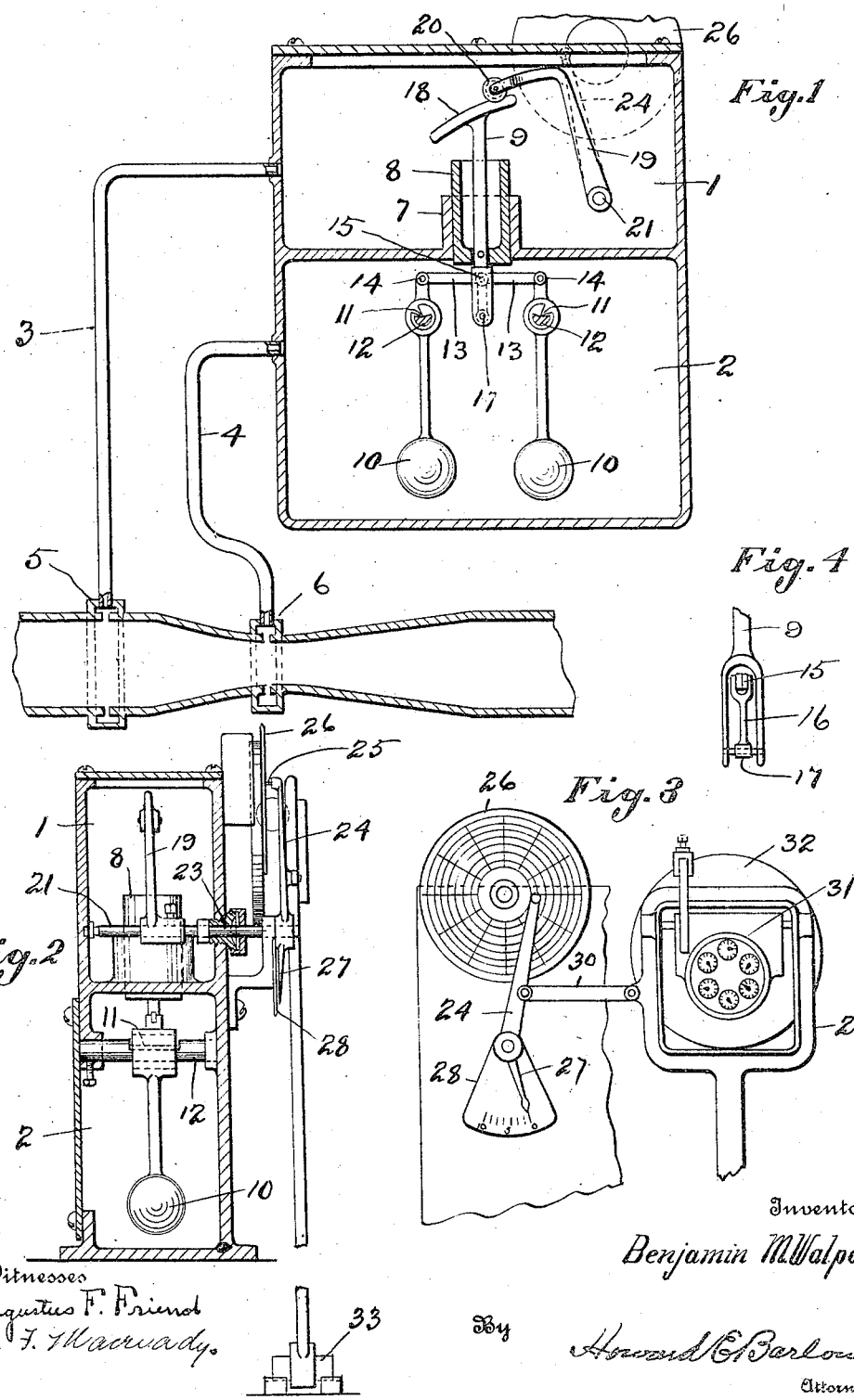

BENJAMIN M. WALPOLE, OF PROVIDENCE, RHODE ISLAND, ASSIGNOR TO BUILDERS IRON FOUNDRY, OF PROVIDENCE, RHODE ISLAND, A CORPORATION OF RHODE ISLAND.

FLUID-METER.

1,146,377.  Specification of Letters Patent.  Patented July 13, 1915.

Application filed August 3, 1914. Serial No. 854,627.

*To all whom it may concern:*

Be it known that I, BENJAMIN M. WALPOLE, a citizen of the United States, and resident of the city of Providence, in the county of Providence and State of Rhode Island, have invented certain new and useful Improvements in Fluid-Meters, of which the following is a specification.

This invention relates to fluid meters of the class provided with a rate of flow exhibiting device operated by differences in pressures caused by the flow through the main. The differences in the pressures are not directly proportional to the flow, and it is much more difficult to construct a meter which will give accurate results when the flow is small than when it is great, since the differences in pressure are so small that it is difficult to cause a sufficiently large movement of the operative parts of the meter by means of these pressures.

The special object of my present improvement is to obtain an inward movement of the operating parts at the beginning of the action of the differential pressures over the mechanism shown in the co-pending patent application Serial Number 845,937.

With these and other objects in view, the invention consists of certain novel features of construction, as will be more fully described and particularly pointed out in the appended claims.

In the accompanying drawings: Figure 1— is a side elevation partly in section showing one form of operating mechanism, the two chambers being in section and connected to a Venturi tube shown on a relatively small scale. Fig. 2— is a sectional end elevation of the mechanism shown in Fig. 1. Fig. 3— is a rear view of the casing showing one form of indicating, integrating and recording mechanism. Fig. 4— is a detail showing the yoke connecting the piston with the pendulum arms.

Referring to the drawings 1 and 2 designate two water tight chambers or compartments. As herein represented compartment 1 is connected by pipe 3 to the larger section or up-stream portion of a Venturi tube at 5, and compartment 2 by pipe 4 to the contracted portion 6 of the Venturi tube, and by means of these pipes the compartments will be filled with the water or gas flowing through the main of which the Venturi tube forms a part. As is well known, when water or gas flows through the Venturi tube the pressure at the contracted portion becomes less than that in the other portion of the main, and consequently in the arrangement illustrated the pressure in compartment 2 also becomes less than that in compartment 1. The Venturi tube is, however, only one of the several well known means of obtaining this difference in pressures, and my invention is not therefore limited to use with a Venturi tube.

Between compartments 1 and 2 is shown a pipe or cylinder 7 open at each end, and in the cylinder 7 is a piston 8 arranged for movement in the cylinder under the influence of differences in pressure in the two compartments. Attached to the piston 8 to partake of its motion and extending downwardly into compartment 2, is the piston rod 9. Suspended in compartment 2 are the pendulums 10 supported on knife edges 11, (Fig. 2), resting upon the supporting arm 12, (see particularly Fig. 2). The rods of the pendulums extend above their respective points of support and each has pivoted thereto at 14 a horizontal link 13, the free ends of these links over-lap and at 15 are pivoted together and to the link 16 and this latter link is in turn pivoted at 17 to the piston rod 9. I prefer to use the two pendulums shown in the drawings, as constituting the best mechanical combination, but one pendulum could be made to perform all necessary functions.

As shown in the drawings the piston rod 9 extends above the piston and bears upon its upper end a cam 18, the purpose of which will be hereinafter stated. An arm 19 extends above this cam and has a roller 20 at its end resting upon the cam. The arm 19 is rigidly attached to the shaft 21, Fig. 2, which extends through a stuffing box 23 to the outside of the compartment 1 and attached to the outer end of this shaft is an arm 24 which may carry a pen 25 at its outer end. This pen is arranged to be moved over the surface of the recording disk 26, see Fig. 3. In this figure the opposite end of this arm is shown as being provided with a pointer 27 adapted to be moved across the face of a graduated fixed plate 28 to serve as an indicator for indicating the rate of flow in the pipe at the time of observation. If an integrator or counter is desired to show the total of the flow the same may be mounted on the frame 29 and connected to the arm 24 by the link 30. This frame is preferably supported on a knife edge 33 at its lower end, providing an inverted pendulum which may carry the weight of the counter mechanism 31 across the face of the usual driving disk 32. As this exhibitor mechanism is shown and described in Patent No. 920,025 further description is deemed unnecessary.

The operation of my device is as follows: When the liquid or gas first begins to flow through the Venturi tube there is only a very slight difference in the pressures and, as these are transmitted through pipes 3 and 4 to the compartments 1 and 2, respectively it is difficult to obtain any such movement of the piston as would serve to accurately indicate the flow or operate any exhibitor mechanism, unless the resistance to that movement is small. As the flow increases, the differences in pressures so increase that there is then no such difficulty. It will be seen that the two links 13, pivoted together at 15 and each pivoted at 14 to its pendulum, as they are arranged, offer very slight resistance to the first downward movement of the piston, since they tend to only slightly disturb the equilibrium of the pendulums, and a sufficient movement for the practical operation of the meter can be thus obtained with a small flow and its attendant slight difference in pressures. As the flow increases and the accompanying differences in pressures also increase, the pendulums offer greater and greater resistance, and thus tend to make the movement of the piston uniform.

If it is desired to only obtain some visual indication of the flow through the main, it can be readily done by a rod or similar device attached to the piston and extending outside of the compartment 1. Where a record is desired it can be obtained by a pen, such as 25, moved by the piston, but owing to the fact already referred to that the flow is not directly proportional to the differences in pressures, some further correction will ordinarily be required. As is well known this correction can be made in the spacing of the rulings upon the dial, but it is frequently desirable to have the rulings uniform or to operate a counter mechanism, and in such cases some correcting mechanism, as the cam 18, properly cut for the purpose, is interposed between the piston and the pen or disk. In the device illustrated in the drawings it is to be understood that the disk 26 is rotated by clock work in the usual manner.

The pendulums are only one form of resistance which may be used. But whatever form is used, it is essential to this invention that the connection between it and the piston or other device movable by the differences of pressures, (all included in the claims under the term "piston"), shall be such that the small initial differences when the flow in the main begins will be permitted to effect a considerable movement in the movable device or member without meeting with much resistive force. As shown in the drawings and herein described this is accomplished by so arranging the parts that the connecting links 13 are pivotally connected to the resistance and will be at as nearly right angles to the line of travel of the piston when there is no flow in the main as is practicable. How nearly this can be accomplished is dependent upon the weight of the piston and other mechanical details.

I claim:

1. In a meter to be operated by differences of pressures caused by a flow through a main, the combination of a piston movable by the differences of pressures, means to resist the movement of the piston, and links movably connected to the piston and resisting means, said links being at substantially right angles to the travel of the piston when in no-flow position.

2. In a meter to be operated by differences of pressures caused by a flow through a main, the combination of a piston movable by the differences of pressures, a pendulum arranged to resist the movement of the piston, and a link pivotally connected to the piston and the pendulum, said link being at substantially right angles to the travel of the piston when in no-flow position.

3. In a meter to be operated by differences of pressures caused by a flow through a main, the combination of a piston movable by the differences of pressures, pendulums arranged to resist the movement of the piston, and links movably connected to the piston and the pendulums, said links being at substantially right angles to the travel of the piston when in no flow position.

4. In a meter to be operated by differences of pressure caused by a flow through a main, the combination of a piston movable by the differences of pressures, means for resisting the motion of the piston, and a connection between the piston and the resistance, said connection being at substantially a right angle to the travel of said piston and so connected to the resistance that the first movement of the piston will produce little resistant force.

5. In a meter to be operated by differences of pressures caused by a flow through a main, the combination of a piston movable by the differences of pressures, a pivoted lever arranged to resist the movement of said piston, a link operatively connected to the piston and resisting means at substantially a right angle to the travel of said piston when in no flow position, and exhibiting means operated by the said piston.

6. In a meter to be operated by differences of pressures caused by a flow through a main, a piston actuated by the differences of pressures, a pendulum for resisting the movement of said piston the same being arranged to hang normally in a vertical position, a link pivotally connected to said piston and to said pendulum at a right angle to both piston and pendulum when the mechanism is in no flow position whereby the first movement of the piston will produce the least resistance, and exhibiting means operated by the said piston.

In testimony whereof I affix my signature in presence of two witnesses.

BENJAMIN M. WALPOLE.

Witnesses:
 HOWARD E. BARLOW,
 A. F. MACREADY.